US011628688B2

(12) United States Patent
Lim et al.

(10) Patent No.: US 11,628,688 B2
(45) Date of Patent: Apr. 18, 2023

(54) RUBBER COMPOSITION FOR TIRE TREAD AND TIRE MANUFACTURED BY USING THE SAME

(71) Applicant: HANKOOK TIRE & TECHNOLOGY CO., LTD., Seongnam-si (KR)

(72) Inventors: Ki Won Lim, Cheongju-si (KR); Byeong Joo Jeon, Daejeon (KR); Sae Um Ahn, Seoul (KR)

(73) Assignee: HANKOOK TIRE & TECHNOLOGY CO., LTD., Seongnam-si (KR)

( * ) Notice: Subject to any disclaimer, the term of this patent is extended or adjusted under 35 U.S.C. 154(b) by 288 days.

(21) Appl. No.: 17/060,492

(22) Filed: Oct. 1, 2020

(65) Prior Publication Data

US 2021/0162807 A1    Jun. 3, 2021

(30) Foreign Application Priority Data

Nov. 29, 2019   (KR) .......................... 10-2019-0156603

(51) Int. Cl.
| | |
|---|---|
| *B60C 1/00* | (2006.01) |
| *C08L 25/10* | (2006.01) |
| *C08L 91/00* | (2006.01) |
| *C08F 136/06* | (2006.01) |
| *C08K 3/36* | (2006.01) |
| *C08K 5/548* | (2006.01) |

(52) U.S. Cl.
CPC .......... *B60C 1/0016* (2013.01); *C08F 136/06* (2013.01); *C08K 3/36* (2013.01); *C08K 5/548* (2013.01); *C08L 25/10* (2013.01); *C08L 91/00* (2013.01); *C08F 2810/40* (2013.01); *C08K 2201/006* (2013.01); *C08L 2205/025* (2013.01); *C08L 2205/035* (2013.01)

(58) Field of Classification Search
CPC ............ B60C 1/00; C08L 25/10; C08L 91/00; C08K 3/36; C08K 5/548; C08F 136/06
USPC ....................................................... 523/156
See application file for complete search history.

(56) References Cited

U.S. PATENT DOCUMENTS

| | | | |
|---|---|---|---|
| 10,273,351 B2 | 4/2019 | Pavon Sierra et al. | |
| 2004/0261927 A1* | 12/2004 | Weydert | C08L 53/02 152/209.5 |
| 2012/0101219 A1* | 4/2012 | Ozturk | C08K 5/42 524/575.5 |
| 2013/0030102 A1* | 1/2013 | Sato | B60C 1/0025 524/502 |
| 2013/0203893 A1* | 8/2013 | Randall | B60C 1/0016 523/351 |

FOREIGN PATENT DOCUMENTS

| | | |
|---|---|---|
| CN | 110317376 A | 10/2019 |
| EP | 2743298 A1 | 6/2014 |
| EP | 3450205 A1 | 3/2019 |
| FR | 2980481 A1 | 3/2013 |
| JP | 2000313771 A1 | 11/2000 |
| KR | 1020050057207 A | 6/2005 |
| KR | 1020140058167 A | 5/2014 |
| WO | 2013077018 A1 | 5/2013 |
| WO | 2013099324 A1 | 7/2013 |
| WO | 2019044890 A1 | 3/2019 |

OTHER PUBLICATIONS

Extended European Search Report issued for EP 20198848.2, dated Mar. 9, 2021.
Office Action issued for Japanese counter-part application, serial No. 2020-168093, dated Oct. 29, 2022.
Office Action issued for Chinese counter-part application, serial No. 202011128467.6, dated Sep. 6, 2022, with English Machine Translation.

* cited by examiner

*Primary Examiner* — Deve V Hall

(74) *Attorney, Agent, or Firm* — Westman, Champlin & Koehler, P.A.; Amanda M. Prose

(57) ABSTRACT

Disclosed are a rubber composition for tire tread and a tire manufactured using the same, in which the rubber composition for tire tread comprises a raw material rubber, which comprises a first solution-polymerized styrene-butadiene rubber with a low glass transition temperature (Tg) and a second solution-polymerized styrene-butadiene rubber with a high glass transition temperature (Tg), a reinforcing filler, a silane coupling agent, a functionalized liquid polymer, and a first resin with a high glass transition temperature and a second resin with a low glass transition temperature.

The rubber composition for tire tread maximizes the dispersion of silica and the interaction with rubber, and thus, the rubber composition is excellent in all of the properties with respect to wear resistance, low fuel economy, and braking performance.

8 Claims, No Drawings

RUBBER COMPOSITION FOR TIRE TREAD AND TIRE MANUFACTURED BY USING THE SAME

CROSS-REFERENCE TO RELATED APPLICATION

This application claims priority to Korean Patent Application No. 10-2019-0156603, filed on Nov. 29, 2019, the disclosure of which is incorporated by reference herein in its entirety.

TECHNICAL FIELD

The present invention relates to the present disclosure relates to a rubber composition for tire tread and a tire manufactured using the same, and more specifically to a rubber composition for tire tread, which simultaneously has excellent wear resistance, low fuel economy, and braking performance, by maximizing the dispersion of silica and its interaction with rubber, and a tire manufactured using the same.

BACKGROUND ART

Recently, environmental problems are continuously emerging and the transition to electric vehicles is occurring very rapidly. With the transition to electric vehicles, above all, not only the low fuel efficiency performance, which is highly associated with the range, but also the heavier weight of an electric vehicle, regenerative braking, and a higher initial torque compared to conventional vehicles, there is a great demand for the improvement of the wear resistance of tires of an electric vehicle by promoting tire wear.

In addition, as the tire labeling system is strengthened, the importance of braking performance on wet roads and low fuel efficiency are increasing day by day.

In addition, with respect to a tire technology in which the properties of wear resistance, braking performance, and low fuel economy of tires are simultaneously combined, many developments are underway especially in the field of materials.

As described above, in order to prepare a rubber composition for tread using silica as a filler without a trade-off of wear resistance, braking performance, and low fuel economy of tires, in what ratio a raw material rubber (e.g., styrene-butadiene rubber (SBR), natural rubber (NR), and butadiene rubber (BR)) is mixed, and in what composition and in what ratio, additives should be composed so that silica can be maximally dispersed in the raw material rubber are most important.

SUMMARY

An object of the present disclosure is to provide a rubber composition for tire tread, which is excellent in all of the properties of wear resistance, low fuel economy, and braking performance, by maximizing the dispersion of silica and its interaction with rubber.

Another object of the present disclosure is to provide a tire manufactured using a rubber composition for tire tread.

According to an embodiment of the present disclosure, there is provided a rubber composition for tire tread, which contains 100 parts by weight of a raw material rubber, which includes 30 to 60 parts by weight of a first solution-polymerized styrene-butadiene rubber with a glass transition temperature (Tg) of −70° C. to −45° C.; and 20 to 50 parts by weight of a second solution-polymerized styrene-butadiene rubber with a glass transition temperature (Tg) of −50° C. to −20° C.; 80 to 110 parts by weight of a reinforcing filler; 6 to 12 parts by weight of a silane coupling agent; 5 to 20 parts by weight of a functionalized liquid polymer; 5 to 30 parts by weight of a first resin with a glass transition temperature (Tg) of 20° C. to 90° C.; and 5 to 20 parts by weight of a second resin with a glass transition temperature (Tg) of −25° C. to −10° C.

The first solution-polymerized styrene-butadiene rubber may have a styrene content of 5 wt % to 30 wt %, have a vinyl content of 10 wt % to 35 wt %, and have a molecular weight distribution (a poly dispersity index) of 2 to 5, and both ends may be modified into an amine or aminosilane, and wherein oil may be contained in an amount of 0 to 35 parts by weight relative to 100 parts by weight of a rubber component.

The second solution-polymerized styrene-butadiene rubber may have a styrene content of 15 wt % to 40 wt %, have a vinyl content of 20 wt % to 50 wt %, and an end may be modified into aminosilane, and wherein oil may be contained in an amount of greater than 0 parts by weight to 37.5 parts by weight or less relative to 100 parts by weight of a rubber component.

The raw material rubber may further contain 20 to 50 parts by weight of a third solution-polymerized styrene-butadiene rubber, which contains oil, has a glass transition temperature (Tg) of −60° C. to −40° C., has a styrene content of 23 wt % to 27 wt %, has a vinyl content of 18 wt % to 22 wt %, and an end is modified into aminosilane; or 20 to 50 parts by weight of butadiene rubber, which has a glass transition temperature (Tg) of −120° C. to −105° C.

The reinforcing filler may be a silica, which has a nitrogen adsorption specific surface area of 150 m$^2$/g to 300 m$^2$/g, has a CTAB adsorption specific surface area of 140 m$^2$/g to 280 m$^2$/g, and has a pH of 5 to 8.

The silane coupling agent may be bis-(triethoxysilylpropyl)tetrasulfide (TESPT).

The functionalized liquid polymer may be a polybutadiene liquid polymer, which has a number average molecular weight (Mn) of 2,000 g/mol to 15,000 g/mol, has a glass transition temperature (Tg) of −50° C. to −25° C., and an end is modified to silane.

The rubber composition for tire tread may contain the first resin, which has a softening point of 90° C. to 130° C., has a glass transition temperature (Tg) of 20° C. to 90° C., and in which naphthenic and aromatic are copolymerized; and the second resin, which has a glass transition temperature (Tg) of −25° C. to −10° C., and in which aliphatic and aromatic are copolymerized at a weight ratio of 1:0 to 3:1.

According to another embodiment of the present disclosure, there is provided a tire manufactured using a rubber composition for tire tread.

MODE FOR INVENTION

Hereinafter, the present disclosure is described in more detail.

In the specification of the present disclosure, a raw material rubber refers to a sum of all of the rubber components contained in a rubber composition. In addition, the raw material rubber excludes additional components such as oil, etc. that each rubber may contain. For example, when the rubber composition contains natural rubber and styrene-butadiene rubber containing oil, the raw material rubber refers to only styrene-butadiene rubber, excluding natural rubber and oil.

An object of the present disclosure is to provide a rubber composition which simultaneously has the properties of wear resistance, low fuel economy, and braking performance on wet roads. However, the properties of wear resistance, low fuel economy, and braking performance on wet roads, which are so called a magic triangle, can be mutually traded off, and thus, it is very difficult to have all of these properties at the same time.

To solve these problems, in the present disclosure, in an effort to maximize the interaction with silica by combining solution polymerization styrene-butadiene rubber (S-SBR) at various glass transition temperatures (Tg) with a high rate of functionalization, and maximally induce the dispersion of silica and its interaction with a raw material rubber while increasing the weight parts of silica as much as possible within an appropriate level, a functionalized liquid polymer, resin, and natural oil, as additives, are mixed in a suitable ratio, and thereby, the properties of wear resistance, low fuel economy, and braking performance on wet roads are simultaneously improved.

As such, the rubber composition for tire tread according to an embodiment of the present disclosure contains a raw material rubber, which contains a first solution-polymerized styrene-butadiene rubber with a low glass transition temperature (Tg) and a second solution-polymerized styrene-butadiene rubber with a high glass transition temperature (Tg), a reinforcing filler, a silane coupling agent, a functionalized liquid polymer, and a first resin with a high glass transition temperature and a second resin with a low glass transition temperature.

The raw material rubber contains 30 to 60 parts by weight of a first solution-polymerized styrene-butadiene rubber (S-SBR (1)), which has a styrene content of 5 wt % to 30 wt %, has a vinyl content of 10 wt % to 35 wt %, and has a molecular weight distribution of 2 to 5, and both ends are modified into an amine or aminosilane, wherein oil is contained in an amount of 0 to 35 parts by weight relative to 100 parts by weight of a rubber component, and has a relatively low glass transition temperature (Tg) of −70° C. to −45° C.; and 20 to 50 parts by weight of a second solution-polymerized styrene-butadiene rubber (S-SBR (2)), which has a styrene content of 15 wt % to 40 wt %, has a vinyl content of 20 wt % to 50 wt %, and an end is modified into aminosilane, wherein oil is contained in an amount of greater than 0 parts by weight to 37.5 parts by weight or less relative to 100 parts by weight of a rubber component, and has a high glass transition temperature (Tg) of −50° C. to −20° C.

Specifically, the raw material rubber may contain 30 to 60 parts by weight of a first solution-polymerized styrene-butadiene rubber (S-SBR (1)), which contains no oil added, has a glass transition temperature (Tg) of −70° C. to −50° C., has a styrene content of 5 wt % to 30 wt % and preferably 13 wt % to 17 wt %, has a vinyl content of 10 wt % to 35 wt % and preferably 23 wt % to 27 wt %, has a molecular weight distribution (a poly dispersity index; PDI) of 2 to 5, and both ends are modified into an amine or aminosilane; and 20 to 50 parts by weight of a second solution-polymerized styrene-butadiene rubber (S-SBR (2)), which contains oil, has a glass transition temperature (Tg) of −30° C. to −10° C., has a styrene content of 15 wt % to 40 wt % and preferably 34 wt % to 38 wt %, has a vinyl content of 20 wt % to 50 wt % and preferably 36 wt % to 40 wt %, and an end is modified into aminosilane.

When only styrene-butadiene rubber with a high glass transition temperature is used, the glass transition temperature of a rubber composition becomes too high and thus there may be a significant difference in performance according to temperature, and wear resistance may also be high. In contrast, when only styrene-butadiene rubber with a low glass transition temperature is used, the glass transition temperature of a rubber composition becomes too low and thus braking performance may be deteriorated.

Meanwhile, the raw material rubber may further contain 20 to 50 parts by weight of a third solution-polymerized styrene-butadiene rubber (S-SBR (3)), which contains oil, has a glass transition temperature (Tg) of −60° C. to −40° C., has a styrene content of 23 wt % to 27 wt %, has a vinyl content of 18 wt % to 22 wt %, and an end is modified into aminosilane.

Alternatively, the raw material rubber may further contain 20 to 50 parts by weight of butadiene rubber, which has a glass transition temperature (Tg) of −120° C. to −105° C., instead of the third solution-polymerized styrene-butadiene rubber.

The first solution-polymerized styrene-butadiene rubber to the third solution-polymerized styrene-butadiene rubber may be denatured in such a manner that one or both ends may be denatured to amine, aminosilane, or denatured to both amine and aminosilane. Examples of an amine compound for the denaturation of solution-polymerized styrene-butadiene rubber may include primary amine, secondary amine, and tertiary amine; and examples of an aminosilane compound for the denaturation of solution-polymerized styrene-butadiene rubber may include aminopropyltrimethoxysilane, aminopropyltriethoxysilane, aminopropylmethyldimethoxysilane, aminopropyldimethylmethoxysilane, N-methylaminopropyltrimethoxysilane, N,N-dimethylaminopropyltrimethoxysilane, N-methylaminopropyltrimethoxysilane, N-methylaminopropyltriethoxysilane, N,N-dimethylpropyltriethoxysilane, peperidinopropyltrimethoxysilane, imidazolinopropyltrimethoxysilane, aminoethylaminopropyltrimethoxysilane, pyrrolidinopropyltrimethoxysilane, piperazinopropyltrimethoxysilane, morpholinopropyltrimethoxysilane, pyrazolinopropyltrimethoxysilane, trizaolinopropyltrimethoxysilane, benzylidene propylaminotrimethoxysilane, etc.

The second solution-polymerized styrene-butadiene rubber (S-SBR (2)) or the third solution-polymerized styrene-butadiene rubber (S-SBR (3)) may contain oil, and the oil content in the rubber may be in an amount of 25 to 50 parts by weight relative to 100 parts by weight of a rubber component. When the second solution-polymerized styrene-butadiene rubber (S-SBR (2)) or third solution-polymerized styrene-butadiene rubber (S-SBR (3)) is mixed in an excess amount, the stiffness of the rubber composition may be decreased.

As the oil to be added in the rubber, any one selected from the group consisting of a petroleum oil, a vegetable oil, and a combination thereof may be used.

As the petroleum oil, any one selected from the group consisting of paraffin oil, naphthenic oil, aromatic oil, and a combination thereof may be used.

However, with the recent rising environmental awareness, it is known that when the content of polycyclic aromatic hydrocarbons (hereinafter, PAHs) is 3 wt % or higher, the risk of causing cancer is high, and thus, it is preferred that treated distillate aromatic extract (TDAE) oil, mild extraction solvate (MES) oil, residual aromatic extract (RAE) oil, or heavy naphthenic oil be used.

As the vegetable oil, any one selected from the group consisting of castor oil, cottonseed oil, flaxseed oil, canola oil, soybean oil, palm oil, coconut oil, peanut oil, pine oil, rosin, tall oil, corn oil, rice oil, safflower oil, sesame oil, olive oil, sunflower oil, palm kernels oil, camellia oil, jojoba oil, macadamia nut oil, tung oil, and a combination thereof may be used.

As the reinforcing filler, highly dispersible silica, which has a nitrogen adsorption specific surface area of 150 m$^2$/g to 300 m$^2$/g, has a CTAB adsorption specific surface area of 140 m$^2$/g to 280 m$^2$/g, and has a pH of 5 to 8 may be used in an amount of 80 to 110 parts by weight.

When the nitrogen adsorption specific surface area of silica is less than 150 m$^2$/g or the CTAB adsorption specific surface area is less than 140 m$^2$/g, the stiffness of the mixed rubber is decreased and thus steering and braking performance on wet roads may be decreased, whereas when the nitrogen adsorption specific surface area of silica exceeds 300 m$^2$/g or the CTAB adsorption specific surface area exceeds 280 m$^2$/g, the dispersion becomes difficult and stiffness may be excessively improved thus reducing the overall performances.

Additionally, a silane coupling agent, which induces the dispersion of silica and a coupling reaction with a raw material rubber, may be contained in an amount of 6 to 12 parts by weight, and specifically 6.5 to 10 parts by weight relative to 100 parts by weight of a rubber component, and at the same time, 5 to 20 parts by weight of a functionalized liquid polymer may be contained relative to 100 parts by weight of a rubber component.

Specifically, as a silane coupling agent used for the dispersion and exhibition of a reinforcing property of silica, a functionalized liquid polymer can be applied as an additive along with bis-(triethoxysilylpropyl)tetrasulfide (TESPT), which is most commonly used, and the liquid polymer may have a number average molecular weight (Mn) of 2,000 g/mol to 15,000 g/mol and a glass transition temperature (Tg) of −50° C. to −25° C. Specifically, the liquid polymer may be a polybutadiene liquid polymer, which has a vinyl content of 55 wt % to 65 wt %, a glass transition temperature of −40° C. to −30° C., and an end is denatured to silane.

When the number average molecular weight (Mn) of the liquid polymer exceeds 15,000 g/mol, processability may be deteriorated, whereas when the glass transition temperature is below −50° C., an excess amount of resin may be used to secure a suitable glass transition temperature for the rubber composition for summer use, and the effect of silica dispersion by functionalization may be deteriorated. In contrast, when the glass transition temperature of the liquid polymer is higher than −25° C., the amount of the liquid polymer to be used is limited and thus it may be difficult to realize the effect.

Additionally, with respect to the resin, 5 to 30 parts by weight of a first resin with a high glass transition temperature, which has a softening point of 90° C. to 130° C., has a glass transition temperature of 20° C. to 90° C., and in which aliphatic or naphthenic and aromatic are copolymerized; and 5 to 20 parts by weight of a second resin with a low glass transition temperature, which has a glass transition temperature of −25° C. to −10° C., and in which aliphatic or aromatic is copolymerized, may be used at a weight ratio of 1:0 to 3:1.

The first resin with a glass transition temperature of room temperature (20° C.) or higher is mixed at a temperature of a softening point or higher when mixed in the rubber composition, and thus, it helps to improve processability, and at a temperature of room temperature (20° C.). At a temperature during the driving using a common tire, the first resin acts as a hard portion and thus helps to improve the stiffness of the rubber.

The first resin may have a glass transition temperature of 20° C. to 90° C. and a softening point of 90° C. to 130° C. When the softening point is below 90° C., the resin in the rubber composition is softened during the process of driving, braking, and steering, the stiffness of the rubber composition may be reduced. Examples of the first resin may be any one selected from the group consisting of C5-based resin, C9-based resin, hydrogenated dicyclopentadiene (DCPD)-based resin, a phenol-based resin, a terpene-based resin, and a mixture thereof.

The second resin has a low effect on the improvement of rubber stiffness compared to the first resin with a glass transition temperature of room temperature (20° C.) or higher, but it can control the glass transition temperature of a rubber composition, and thus can increase the entire content of resin and helps to improve processability. Examples of the second resin may be any one selected from the group consisting of C9-based liquid petroleum resin, acrylic resin, styrene acrylic resin, and a mixture thereof.

Additionally, the rubber composition for tire tread may further contain sulfur as a vulcanizing agent, zinc oxide and stearic acid as a vulcanizing activator, a process oil as a softening agent, a vulcanization accelerator, an anti-aging agent, etc.

The rubber composition for tire tread is not limited to tread (a tread cap and tread base), but may be included in various rubber components that constitute tires. Examples of rubber constituting components may include sidewalls, sidewall inserts, apexes, chafers, wire coats, inner liners, etc.

In another embodiment according to the present disclosure, tires are manufactured using a rubber composition for tire tread. The method for manufacturing tires using rubber composition for tire tread may be any conventional method used for the manufacture of tires, and thus the details of the method is abbreviated herein.

The tire may be a tire for passenger vehicles, a tire for racing, a tire for airplanes, a tire for agricultural machines, a tire for off-the-road, a tire for trucks, or a tire for buses tire, etc. In addition, the tire may be used as a radial tire or bias tire.

Hereinafter, embodiments of the present disclosure will be described in detail so that one of ordinary skill in the art to which the present disclosure belongs can easily implement the same. However, the present disclosure may be implemented in various different forms, and is not limited to the embodiments described herein.

MANUFACTURING EXAMPLE 1

Preparation of Rubber Composition for Tire Tread

Tire rubber compositions according to Examples and Comparative Examples were prepared using the compositions shown in Table 1 below. The manufactures of the tire rubber compositions were according to a conventional method of manufacturing tires, and is not particularly limited.

The blending agents in the compositions shown in Table 1 below were blended in a Banbary mixer and released at 150° C. The physical property test was performed by vulcanizing the obtained rubber specimens at 168° C.

TABLE 1

|  | Comp. Ex. 1 | Comp. Ex. 2 | Ex. 1 | Ex. 2 | Ex. 3 | Ex. 4 | Ex. 5 | Ex. 6 |
|---|---|---|---|---|---|---|---|---|
| S-SBR (1) | 40 | — | — | — | — | — | — | — |
| S-SBR (2) | 55 (40) | 110 (80) | — | — | — | — | — | — |
| S-SBR (3) | — | — | 40 | 40 | 40 | 40 | 40 | 40 |
| S-SBR (4) | — | — | 50 (40) | 50 (40) | 50 (40) | 50 (40) | 37.5 (30) | 37.5 (30) |
| S-SBR (5) | — | — | — | — | 25 (20) | 25 (20) | 37.5 (30) | 37.5 (30) |
| BR | 20 | 20 | 20 | 20 | — | — | — | — |
| Silica | 85 | 90 | 95 | 95 | 95 | 95 | 100 | 100 |
| Carbon Black | 4 | 4 | 4 | 4 | 4 | 4 | 4 | 4 |
| TESPT | 6.8 | 7.2 | 7.2 | 7.2 | 7.2 | 7.2 | 8.0 | 8.0 |
| Liquid Polymer | — | — | — | 5 | 5 | 10 | 10 | 15 |
| High Tg Resin | — | — | 9 | 6 | — | 5 | 5 | 5 |
| Low Tg Resin | — | — | 6 | 9 | 10 | 5 | 5 | — |
| Processing Aid | 5 | 5 | 3 | 3 | 3 | 3 | 3 | 3 |
| Process Oil | 15 | 13 | 10 | 5 | 5 | 2 | 5 | 5 |
| Zinc Oxide | 2 | 2 | 1 | 1 | 1 | 1 | 1 | 1 |
| Stearate | 1 | 1 | 1 | 1 | 1 | 1 | 1 | 1 |
| Anti-Aging Agent (6C) | 2 | 2 | 2 | 2 | 2 | 2 | 2 | 2 |
| DPG | 2 | 2 | 2.5 | 2.5 | 2.5 | 2.5 | 2.5 | 2.5 |
| Sulfur | 1.0 | 1.0 | 1.0 | 1.0 | 1.0 | 1.0 | 1.0 | 1.0 |
| CBS | 2.2 | 2.2 | 2.2 | 2.2 | 2.2 | 2.2 | 2.2 | 2.2 |
| Ultra-Accelerator | 0.2 | 0.2 | 0.2 | 0.2 | 0.2 | 0.2 | 0.2 | 0.2 |

(parts by weight)
S-SBR (1): S-SBR, which contains no oil added, has a glass transition temperature of about 25° C., has a styrene content of 26 wt % to 30 wt %, a vinyl content of 41 wt % to 45 wt %, in which an end is denatured to aminosilane.
S-SBR (2): S-SBR, which contains oil, has a glass transition temperature of about 36° C., has a styrene content of 34 wt % to 38 wt %, a vinyl content of 24 wt % to 28 wt %, in which an end is denatured to aminosilane. The content of oil added is 37.5 parts by weight relative to 100 parts by weight of a rubber component (the values in parentheses are the contents of pure rubber components excluding the content of oil).
S-SBR (3): S-SBR, which contains no oil added, has a glass transition temperature of about 60° C., has a styrene content of 13 wt % to 17 wt %, a vinyl content of 23 wt % to 27 wt %, in which both ends are denatured to amine or aminosilane.
S-SBR (4): S-SBR, which contains oil, has a glass transition temperature of about −21° C., has a styrene content of 34 wt % to 38 wt %, a vinyl content of 36 wt % to 40 wt %, in which an end is denatured to aminosilane. The content of oil added is 25 parts by weight relative to 100 parts by weight of a rubber component (the values in parentheses are the contents of pure rubber components excluding the content of oil).
S-SBR (5): S-SBR, which contains oil, has a glass transition temperature of about 53° C., has a styrene content of 23 wt % to 27 wt %, a vinyl content of 18 wt % to 22 wt %, in which an end is denatured to aminosilane. The content of oil added is 25 parts by weight relative to 100 parts by weight of a rubber component (the values in parentheses are the contents of pure rubber components excluding the content of oil).
BR: butadiene rubber, which has a glass transition temperature of −106° C.
Silica: highly dispersible silica, which has a nitrogen adsorption specific surface area of 170 m$^2$/g and a CTAB adsorption specific surface area of 160 m$^2$/g
Carbon Black: N234
TESPT: Si69 (Degussa)
Liquid Polymer: a polybutadiene liquid polymer, which has a vinyl content of 55 wt % to 65 wt % and a glass transition temperature of −40° C. to −30° C., in which an end is denatured to silane
High Tg Resin: a copolymer, which has a softening point of 95° C. to 115° C. and a glass transition temperature of 25° C. to 40° C., in which naphthenic and aromatic are copolymerized
Low Tg Resin: C9-based liquid petroleum resin, which has a glass transition temperature of −25° C. to −10° C.
Anti-Aging Agent (6C): N-1,3-dimethylbutyl-N-phenyl-p-phenylenediamine
DPG: diphenyleneguanidine
CBS: N-cyclohexyl-2-benzothiazyl sulfenamide

EXPERIMENTAL EXAMPLE 1

Measurement of Performance of Manufactured Rubber Compositions

For the obtained specimens, Mooney viscosity, hardness, 300% modulus, and viscoelasticity were measured according to ASTM related regulations, and the results are shown in Table 2.

TABLE 2

|  | Comp. Ex. 1 | Comp. Ex. 2 | Ex. 1 | Ex. 2 | Ex. 3 | Ex. 4 | Ex. 5 | Ex. 6 |
|---|---|---|---|---|---|---|---|---|
| Mooney Viscosity (ML1 + 4) | 75 | 83 | 85 | 87 | 79 | 83 | 89 | 91 |
| Hardness (ShoreA) | 67 | 69 | 68 | 69 | 68 | 70 | 70 | 69 |
| 300% Modulus | 128 | 115 | 120 | 123 | 119 | 115 | 121 | 123 |
| Breaking Energy | 185 | 195 | 205 | 212 | 220 | 197 | 192 | 207 |
| Wet Grip Index | 100 | 103 | 104 | 106 | 104 | 105 | 107 | 107 |
| 30° C. G*(E+06) | 7.2 | 9.5 | 10.2 | 10.8 | 10.0 | 10.5 | 11.8 | 12.0 |

TABLE 2-continued

|  | Comp. Ex. 1 | Comp. Ex. 2 | Ex. 1 | Ex. 2 | Ex. 3 | Ex. 4 | Ex. 5 | Ex. 6 |
|---|---|---|---|---|---|---|---|---|
| 60° C. tan δ | 0.107 | 0.123 | 0.120 | 0.113 | 0.110 | 0.105 | 0.121 | 0.115 |
| Lambourn Wear Index | 100 | 95 | 123 | 119 | 126 | 135 | 127 | 132 |

Mooney Viscosity (ML1 + 4(125° C.)) was measured according to ASTM standard D1646.
Hardness was measured according to DIN 53505.
300% Modulus and breaking energy were measured according to the ISO 37 standard.
For viscoelasticity, G', G", and tan δ were measured under the frequency of 10 Hz with a strain of 0.5% using an ARES measurement device.

In Table 2, ML1+4 represents the viscosity value of unvulcanized rubber, and as the value becomes lower, the processability of the unvulcanized rubber becomes more excellent. Hardness is associated with steering stability, and as the value becomes higher, the steering stability becomes more excellent. Breaking energy represents the energy required to rupture the rubber. As the value becomes higher, the energy required becomes higher, and thus, the wear performance becomes more excellent. Wet Grip Index represents the braking characteristic on the surface of wet roads, and as the value becomes higher, the braking performance becomes more excellent. 30° C. G* represents the stiffness of a rubber composition and is associated with braking and steering performance on dry and wet road surfaces, and as the value becomes higher, the braking steering performances become more excellent. In addition, 60° C. tans represents the rotational resistance characteristic, as the value becomes lower, the rotational resistance characteristic becomes more excellent, and as the Lambourn wear index becomes higher, the wear performance becomes more excellent.

Referring to Table 2, in the case of the Examples, it can be seen that the breaking energy is improved while the modulus of 300% is maintained. In addition, it can be seen that while 60° C. tan δ is maintained or improved. As the Wet Grip Index and 30° C. G* become improved, the Lambourn wear index is particularly improved significantly, and thus, it can be seen that low fuel performance can be maintained while wear resistance and braking performance are improved.

That is, according to the present disclosure, in an effort to maximize the interaction with silica by combining solution polymerization styrene-butadiene rubber (S-SBR) at various glass transition temperatures (Tg) with a high rate of functionalization, and maximally induce the dispersion of silica and its interaction with a raw material rubber while increasing the weight parts of silica as much as possible within an appropriate level, a functionalized liquid polymer, resin, and natural oil, as additives, are mixed in a suitable ratio, and thereby, the properties of wear resistance, low fuel economy, and braking performance on wet roads can be simultaneously improved.

Although the preferred embodiments of the present disclosure have been described in detail above, the scope of the present disclosure is not limited thereto, and various modifications and improvements of one of ordinary skill in the art using the basic concept of the present disclosure defined in the following claims are also within the scope of the present disclosure.

Advantageous Effects of the Invention

The rubber composition of the present disclosure maximizes the dispersion of silica and its interaction with rubber, and thus, the rubber composition of the present disclosure is excellent in all of the properties with respect to wear resistance, low fuel economy, and braking performance.

The invention claimed is:
1. A rubber composition for tire tread, comprising:
100 parts by weight of a raw material rubber, which comprises 30 to 60 parts by weight of a first solution-polymerized styrene-butadiene rubber with a glass transition temperature (Tg) of −70° C. to −45° C.; and 20 to 50 parts by weight of a second solution-polymerized styrene-butadiene rubber with a glass transition temperature (Tg) of −50° C. to −20° C.;
80 to 110 parts by weight of a reinforcing filler; based on 100 parts by weight of the raw material rubber;
6 to 12 parts by weight of a silane coupling agent based on 100 parts by weight of the raw material rubber;
5 to 20 parts by weight of a functionalized liquid polymer based on 100 parts by weight of the raw material rubber; and
at least one resin selected from the group consisting of a first resin with a glass transition temperature (Tg) of 20° C. to 90° C. and a second resin with a glass transition temperature (Tg) of −25° C. to −10° C.;
wherein a content of the first resin is 0 to 30 parts by weight based on 100 parts by weight of the raw material rubber, and
wherein a content of the second resin is 0 to 20 parts by weight based on 100 parts by weight of the raw material rubber,
wherein the first solution-polymerized styrene-butadiene rubber has a styrene content of 5 wt % to 30 wt %, has a vinyl content of 10 wt % to 35 wt %, and has a molecular weight distribution (a poly dispersity index) of 2 to 5, and both ends are modified into an amine or aminosilane, and
wherein oil is contained in an amount of 0 to 35 parts by weight relative to 100 parts by weight of a rubber component.
2. The rubber composition for tire tread of claim 1, wherein the second solution-polymerized styrene-butadiene rubber has a styrene content of 15 wt % to 40 wt %, has a vinyl content of 20 wt % to 50 wt %, and an end is modified into aminosilane, and
wherein oil is contained in an amount of greater than 0 parts by weight to 37.5 parts by weight or less relative to 100 parts by weight of a rubber component.
3. The rubber composition for tire tread of claim 1, wherein the raw material rubber further comprises:
20 to 50 parts by weight of a third solution-polymerized styrene-butadiene rubber, which comprises oil, has a glass transition temperature (Tg) of −60° C. to −40° C., has a styrene content of 23 wt % to 27 wt %, has a vinyl content of 18 wt % to 22 wt %, and an end is modified into aminosilane; or

20 to 50 parts by weight of butadiene rubber, which has a glass transition temperature (Tg) of −120° C. to −105° C.

4. The rubber composition for tire tread of claim 1, wherein the reinforcing filler is a silica, which has a nitrogen adsorption specific surface area of 150 $m^2/g$ to 300 $m^2/g$, has a CTAB adsorption specific surface area of 140 $m^2/g$ to 280 $m^2/g$, and has a pH of 5 to 8.

5. The rubber composition for tire tread of claim 1, wherein the silane coupling agent is bis-(triethoxysilylpropyl)tetrasulfide (TESPT).

6. The rubber composition for tire tread of claim 1, wherein the functionalized liquid polymer is a polybutadiene liquid polymer, which has a number average molecular weight (Mn) of 2,000 g/mol to 15,000 g/mol, has a glass transition temperature (Tg) of −50° C. to −25° C., and an end is modified to silane.

7. The rubber composition for tire tread of claim 1, wherein the rubber composition for tire tread comprises:
the first resin, which has a softening point of 90° C. to 130° C., has a glass transition temperature (Tg) of 20° C. to 90° C., and in which aliphatic or naphthenic and aromatic are copolymerized; and
the second resin, which has a glass transition temperature (Tg) of −25° C. to −10° C., and in which aliphatic and aromatic are copolymerized,
at a weight ratio of 1:0 to 3:1.

8. A tire manufactured using the rubber composition for tire tread according to claim 1.

\* \* \* \* \*